United States Patent
Smith

(12) United States Patent
(76) Inventor: Wayne Tracy Smith, Auckland (NZ)
(*) Notice: Subject to any disclaimer, the term of this patent is extended or adjusted under 35 U.S.C. 154(b) by 0 days.

(10) Patent No.: US 8,695,273 B2
(45) Date of Patent: Apr. 15, 2014

(54) WASTE FISHING LINE HOLDER

(21) Appl. No.: 13/447,052

(22) Filed: Apr. 13, 2012

(65) Prior Publication Data
US 2013/0269237 A1    Oct. 17, 2013

(51) Int. Cl.
*A01K 97/06*        (2006.01)
(52) U.S. Cl.
USPC ............................................. 43/54.1; 24/570
(58) Field of Classification Search
USPC .................. 43/54.1; 242/159; D11/78.1, 215;
D19/65; 24/570, 545, 546
See application file for complete search history.

(56) References Cited

U.S. PATENT DOCUMENTS

| | | | |
|---|---|---|---|
| 742,892 A | 11/1903 | McGill | |
| 742,893 A | 11/1903 | McGill | |
| 1,493,072 A * | 5/1924 | Fricker | 24/563 |
| 1,857,488 A * | 5/1932 | Weeks | 24/563 |
| 2,440,989 A | 5/1948 | Van Brunt | |
| 2,478,376 A * | 8/1949 | De Swart | 24/67.9 |
| 2,650,448 A | 9/1953 | Lichtig | |
| 2,749,649 A | 6/1956 | Fitzsimmons | |
| 2,846,804 A | 8/1958 | Elliott | |
| 3,164,334 A | 1/1965 | Gris | |
| 3,581,428 A | 6/1971 | Helder | |
| 3,761,976 A | 10/1973 | D'Amico | |
| D239,147 S * | 3/1976 | Karlsen | D11/215 |
| 4,055,874 A * | 11/1977 | Brown | 24/67.3 |
| 4,067,134 A | 1/1978 | Billings | |
| 4,221,068 A | 9/1980 | Roemer, Jr. | |
| 4,237,587 A | 12/1980 | Hsiao et al. | |
| 4,513,524 A | 4/1985 | Jolliff | |
| 4,928,361 A | 5/1990 | Brown | |
| 4,947,524 A * | 8/1990 | Chang | 24/67.9 |
| 4,974,764 A * | 12/1990 | Cantwell | 224/269 |
| 5,022,124 A * | 6/1991 | Yiin | 24/67.9 |
| 5,632,069 A * | 5/1997 | Mievis | 24/337 |
| 6,052,936 A * | 4/2000 | Garcia | 43/4 |
| D437,613 S * | 2/2001 | Melnyk | D19/34 |
| 6,192,619 B1 | 2/2001 | Pirkle | |
| 7,140,148 B1 * | 11/2006 | Williams, II | 43/54.1 |
| 7,975,953 B2 | 7/2011 | White | |
| 2008/0061184 A1 | 3/2008 | Simbirski et al. | |
| 2009/0211062 A1 * | 8/2009 | Preston-Hall | 24/17 B |
| 2010/0006691 A1 | 1/2010 | White | |

\* cited by examiner

*Primary Examiner* — Kimberly Berona

(57) ABSTRACT

The present invention relates generally to a waste fishing line holder for anglers carried by a person while fishing. It secures the waste fishing line that an angler generates when changing flies or fishing rigs. The holder is carried in an angler's pocket, a tackle box or attached to an item of clothing or gear. The apparatus is mostly comprised of a generally J shaped body with a long leg and a short leg and being of elongate length of rigid and durable material with an area of deformable resilient and cushioned material attached to the short leg. Formed so that line is held securely in a slit/gap between the long leg and deformable cushioned material.

9 Claims, 3 Drawing Sheets

WASTE FISHING LINE HOLDER

BACKGROUND OF THE INVENTION

1. Field of Invention

The present invention relates generally to a waste fishing line holder for anglers, carried by a person while fishing, it secures the waste fishing line an angler creates while fishing.

Particularly to a personal waste fishing line holder, which is generally carried in an angler's pocket or attached to an item of clothing or gear. It helps keeps wastes fishing line out of the environment until the angler can properly dispose of it.

Spent line is coiled around the device then pulled into its line retention slot where it is releasably secured. The apparatus is mostly comprised of an elongated section of rigid and durable material with an area of deformable resilient and cushioned material formed so that it secures the line by compressing it between the two materials.

The holder is practical, easily carried and simple to use. The device can also be use as a general line holder, holding any type of line, thread, floss, string, cable, cord, or similar materials.

2. Background of the Invention

A fishing line is a cord used or made for fishing, usually in conjunction with the pastime of angling. Modern fishing lines intended for, spinning, spin cast, fly fishing, or bait casting reels are almost entirely made from artificial substances, including nylon, polyvinylidene fluoride (PVDF, and called fluorocarbon), polyethylene, Dacron and Dyneema (UHM-WPE). The most common type is monofilament, made of a single strand.

While fishing, anglers create waste line that is hard to secure and can easily find it way into the environment. The waste line is often created when an angler changes or replaces terminal tackle. Traditionally anglers wad up spent line and put it in a pocket ground or in the water. Small pieces of line are especially hard to secure and often become litter. Waste fishing line as litter is environmentally unsound as it's unsightly, takes years to decompose and most importantly is dangerous to animals.

The object of the present invention is to provide a simple and ergonomic waste fishing holder that overcomes the disadvantages referred to above.

3. Prior Art

There's little prior art that relates directly to personal waste fishing line holders and limited prior art on general personal fishing line holders. Various forms of fishing line downrigger release clips are similar in construction to the present invention; of these most are some forms of mechanical clips. Even a common paper clip has something in common with the present invention but they're also significantly different in design and construction.

Though the following art may have similar attributes to the present invention, all have distinct design and material differences. Reference to relevant art follows, especially:

(a) US Patent No. 2010/0006691 A1 and U.S. Pat. No. 7,975, 953 B2 represents a product call the "Mono Master" it can be found on www.monomaster.com. It is: "A device for collection and storage of waste monofilament line or similar materials. The device has a rotating spool mechanism in the form of an inner spool with an outer surface to which line adheres rotated by a rotation operator coupled to the spool." In general this invention strives to solve the same problem as the present invention but differs in design and construction. The main difference being that it represents a mechanical device with moving parts where the waste line is spooled around the surface of an enclosed spool. The present invention secures line by compressing it between an area of cushioned and deformable material and the ridged rigid and durable material, this invention does not.

(b) US Pat. No. 2008/0061184 A1 represents another mechanical device with moving parts for collecting and storing waste fishing line and similar. Again, this invention strives to solve the same problem as the present invention but differs in design and construction. With this invention; "The device collects the material by pulling it into an enclosed collection cylinder." And again, the present invention secures line by compressing it between an area of deformable resilient and cushioned material, this invention does not.

The following prior art lacks at least one of the following claims of the present invention. The present invention has been adapted to a personal and pocket able device for securement of waste fishing line where: 1) the line is releasably held by being compressed between a deformable resilient cushioned material and a rigid and durable material; 2) the receiver includes a means to coil the line around the device before it enters the receiver.

See U.S. Pat. Nos. 4,221,068; 2008/0061184 A1; 2,846, 804; 6,192,619; 2,650,448; 4,067,134; 4,513,524; 3,581,428; 3,761,976; 3,164,334; 4,928,361; 4,237,587; 2,440,989; 2,749,649; 742,892; 742,893.

OBJECTS AND ADVANTAGES

In keeping with the principle of the present invention the waste fishing line holder is unique and technically different from other forms of holders.

The line holder is uncomplicated in design, ergonomic, portable and easy to use. It can be carried in a pocket or attached to and worn on any article "of clothing or gear. It can also be placed in a tackle box, fishing creel, a boat or car cubbyhole. The line is held securely and in a fashion that it won't get released into the environment. The holder allows spent line to be easily inserted while fishing and easily removed for disposal. It's construct of materials that can stand up to the rigors of fishing and is easily maintained.

Therefore the primary objective of the present invention is to provide an apparatus for use by anglers that holds spent fishing line securely while fishing.

The line retention apparatus in it simplest form is generally formed of a single member comprised of two main sections, an elongated finger for coiling the line around and a section where the line secured.

The line holder is generally formed of a body made of a elongated section of rigid and durable material folded back parallel upon itself at one end creating the two main sections: The line coil finger and the line retention slit/gap. Statically affixed to a selected area of the line retention slot is a portion of a deformable resilient and cushioned material positioned so that one side of this material comes in contact with the body, creating a slit/gap in which the line is held releasably by being inter-fitted between the area of the cushioned material and the rigid and durable base material. Having deformable resilient and cushioned material on one side of the slot allows the holder to accommodate multiple pieces and different types and sizes of lines. Having a rigid and durable material on the other side of the slot allows the line to be easily inserted and removed from the holder.

The holder's general shape is in the form of an elongated "J". The straight section of the "J" forms the finger section for the line to be coiled around and the bottom and opposing portion of the "J" forms the line retention area. The shorter parallel section of the "J" is generally where the deformable and resilient material, such as leather, rubber, foam or silicone rubber, is attached.

The holder can be further formed with a connection point should the wearer want to attach the holder to an article of clothing or gear using a lanyard, cable reel retractor or similar.

Accordingly, there is a need to provide an improved waste fishing holder for anglers.

SUMMARY

It is therefore an object of the invention to provide a waste fishing holder to enable an angler to securely hold waste fishing line.

It's also an object of the invention to provide a spent line holder where the fishing line is both easily inserted and removed from the holder.

It's another object of the invention to provide a waste fishing holder that is capable of holding multiple pieces of and of different types and sizes of lines.

It's still another object of the invention to provide a waste fishing line holder that can be carried in a pocket or fastened on any type of clothing and gear.

It's also an object of the invention to provide a waste fishing line holder which can stand up to the rigors or fishing while being easy to clean and maintain.

In accordance with the above and the other objects of the present invention, which will be discussed in detail below, a personal and waste fishing holder is provided.

Preferred embodiments of the invention are disclosed in the following descriptions.

In the following embodiments the primary sections are interchangeable creating a new embodiment.

In the following embodiments the primary sections are interchangeable creating a new embodiment.

According to a first embodiment of the invention, the waste fishing line holder in its simplest form is made from a flat piece of rigid and durable material(s) such as metal or plastic forming the body that makes up both the finger that the user uses to wrap the fishing line around and with a housing section at one end that holds a rectangular piece of deformable resilient and cushioned material, such as foam rubber, that forms the line retention slot.

The foam rubber housing section is created when the base at one end is folded back parallel upon itself leaving a gap where the foam rubber is affixed to the inside surface of the short section of the flat base material. The thickness of the foam rubber along with the gap dimensions are such that the foam rubber is compressed upon the inside surface of the base creating a compressed slot in which the fishing line is held releasably by being inter-fitted between the area of the cushioned material and the ridged and durable base material.

According to a second embodiment of the invention, the base is once again made from a flat body member and the finger is further comprised of a offset in the body, angled away from the line retention slot and located just inside the point where the foam compresses upon the body material making it harder for the line to get tripped up on or damage the corner of the foam rubber as it enters the compression slot.

According to a third embodiment of the invention, the body is once again made from a flat body member and the finger is further comprised with cutout approximately in the center of the finger section. The cutout can be of any shape, such as circles or rectangles, in this embodiment the cutout is in the shape of a fish. The cutout is both cosmetic and practical. It makes it easier to hold the line in position while starting to coil it around the finger section. Line is easier held in position by being pinched between flesh (fingers) using the cutout, than being held between flesh (a finger) and metal.

According to a forth embodiment of the invention, the receiver, is further formed with a hole located approximately at the bend where the base is folded upon itself. The hole is a attachment point should the wearer want to attach the holder to an article of clothing or gear using a lanyard, cable reel retractor or even looped around the neck using a cord or similar.

According to a fifth embodiment of the invention, the body is once again comprised of a flat body member and the section of the body that contacts the foam rubber creating the line retention slot has a rectangular cutout approximately the same width of the foam rubber pad and in the vertical center of this section allowing scissors to be more easily used when removing spent line from the holder.

According to a eight embodiment of the invention, the size of the elongated finger section is such that it is approximately the same width as an adults two fingers; allowing persons to easily wrap line around both the finger section and the persons index and middle fingers at the same time. Making it faster to secure longer lengths of line.

Other objects and advantages of the present invention will become apparent to those skilled in the art upon reference to the following detailed description and appended claims, and upon reference to the accompanying drawings.

DRAWINGS

Figures

In the drawings, closely related figures have the same number but different alphabetic suffixes.

Figure 1:
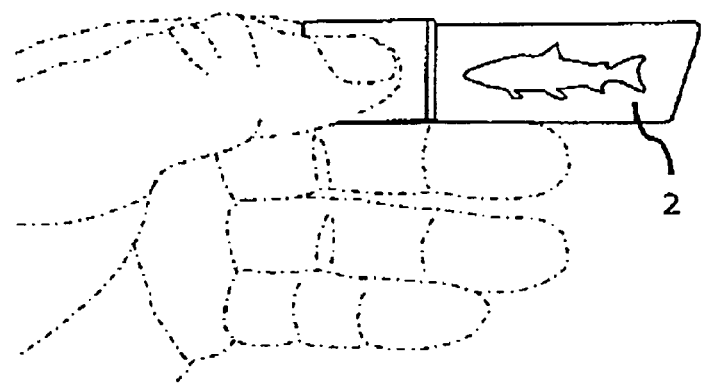
FIG. 1 is an elevation view, partly broken away, illustrating the waste fishing line holder held in a persons hand.

| DRAWINGS - Reference Numerals | |
|---|---|
| 2 waste line holder | 4 flat body |
| 6 waste fishing line | 8 deformable and cushioned material |
| 10 line retention slit/gap | 12 line access gap |
| 14 body offset | 16 foam retention tang |
| 18 rectangular cutout | 20 fish shaped cutout |
| 22 attachment point hole | 24 scissor access cutout |

DETAILED DESCRIPTION OF THE PREFERRED EMBODIMENT(S)

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

With reference to the drawings, in general, and to FIG. 1 in particular, multi-featured waste fishing line holder apparatus #2 embodying the principles of the present invention is generally depicted. The #2 line holder is shown in an angler's hand.

Figure 2A:
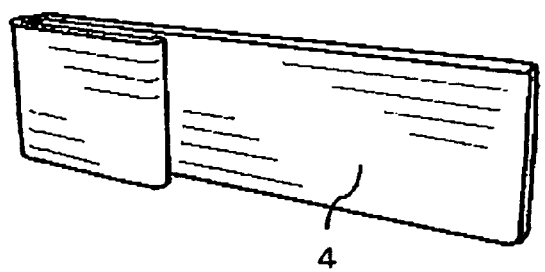
FIG. 2A is a perspective view of a preferred embodiment of the present invention in a simple form.

FIG. 2A a perspective front view of the rod holder in one preferred embodiment, the line holder in this form is made form a elongated flat piece of rigid metal or plastic.

Figure 2B:
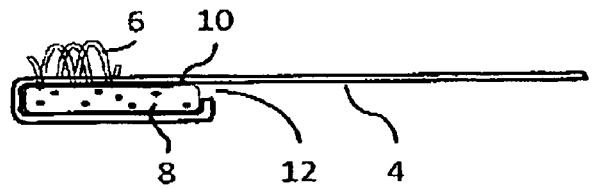
FIG. 2B is a top plan view of the holder further illustrating the general shape of the receiver and illustrating the shape and positioning of the deformable and cushioned material and how it forms the line retention slot.

FIG. 2B a top plan view of the preferred embodiment of FIG. 2A shows in more detail the placement of the #8 deformable and cushioned material is and how it and the #4 flat body forms the #10 line retention gap holding #6 waste fishing line and #12 the line access gap.

Figure 2C:
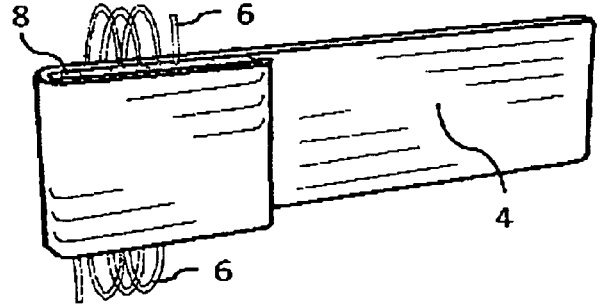
FIG. 2C is a perspective view, further illustrating the position of the waste line in the holder.

FIG. 2C a front elevation view of the preferred embodiment of FIG. 2A shows in more detail how the #2 waste line holder retains the #6 waste fishing line.

Figure 2D:
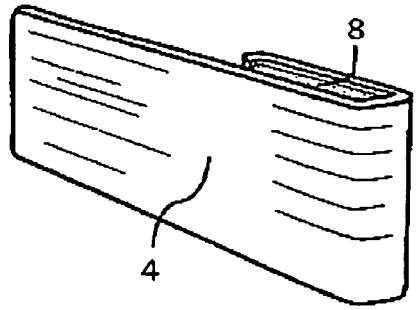
FIG. 2D is a rear view of the receiver illustrating the backside of the body.

FIG. 2D a rear elevation view of the preferred embodiment of FIG. 2A shows in more detail the back of the #2 waste line holder.

Figure 3:
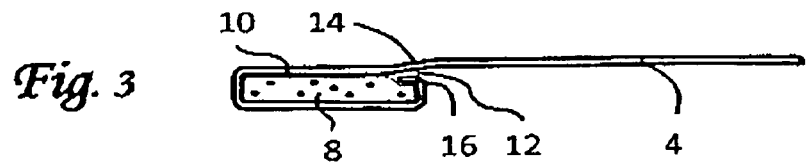
FIG. 3 is a top plan view of the holder illustrating the offset of the finger section of the body located at the opening of the line retention slot and the foam retention tab also located at the opening of the line retention slot.

Referring to FIG. 3 is a top plan view of the line holder in one preferred embodiment, the #4 flat body further comprises #14 body offset and #16 foam retention tang located at #12 line access gap.

Figure 4:
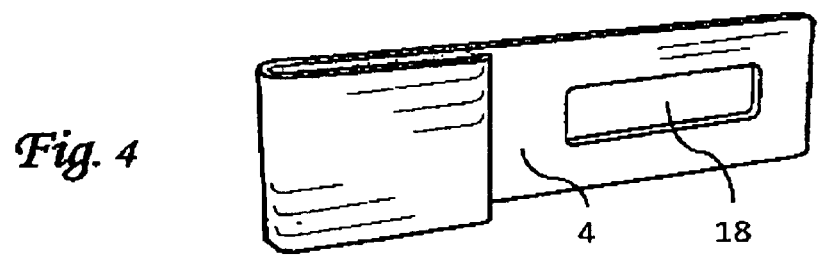
FIG. 4 is a perspective view of another embodiment illustrating a rectangular cutout in the finger portion of the holder.

Referring to FIG. 4 a perspective front view of the line holder in one preferred embodiment, the #4 flat base further comprises #18 rectangular cutout.

Figure 5:
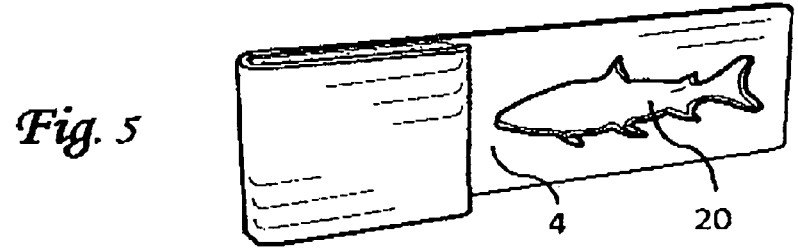
FIG. 5 is a perspective view of another embodiment illustrating a fish shaped cutout in the finger portion of the holder.

Referring to FIG. 5 a perspective front view of the waste line holder in one preferred embodiment, further illustrates an alternative shape of the #4 flat base comprising a #20 fish shaped cutout.

Figure 6:
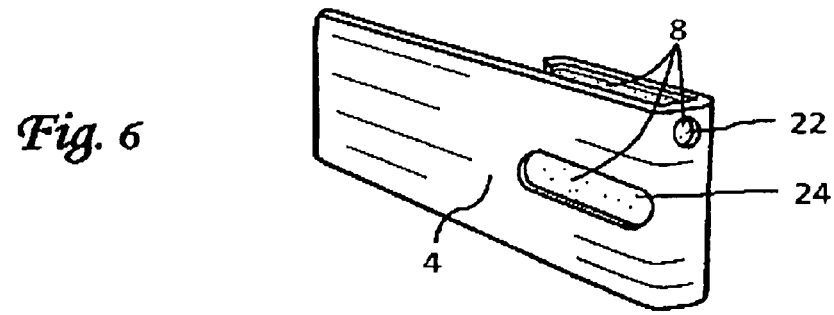
FIG. 6 is a rear perspective view of another embodiment illustrating a rectangular cutout in the line retention section of the holder and a hole located in the bend of the base.

Referring to FIG. 6 a perspective rear view of the rod holder in one preferred embodiment, the #4 flat body comprises a #22 attachment point hole and #24 scissor access cutout.

One or more of the various advantageous features of the present invention may be incorporated into the fishing rod retention apparatus for beneficial results. These features provide benefit individually as well as collectively to produce a wearable fishing rod holder.

The foregoing description should be considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fisherman's line holder for securing lines and cords, comprising:

a rigid, generally J-shaped body comprising a connected long leg and short leg providing a space there between, said body comprised of a rigid and durable material;

a line retention means provided within said space between said long leg and said short leg, said line retention means comprising a section of resilient cushioned material having a first face and second face, said first face being statically affixed to the inside face of said short leg and extending within said space such that the second face of the line retention means is touching but not affixed to the inner face of the long leg; wherein the inner face of the long leg and the second face of the line retention means provides for a retaining area for said line such that when said line retention means is compressed, said line is insertable between said second face and said inner face of the long leg and when the line retention means is not compressed will retain said line between said inner face of the long leg and the second face of the line retention means;

said long leg comprising a flat, elongate finger portion extending away from the line retention means, such that the finger portion can be used to coil the line about said finger portion prior to being inserted between the second face of the line retention means and the inner face of the long leg.

2. The fisherman's line holder as claimed in claim 1, wherein said long leg and said short legs are substantially parallel.

3. The fisherman's line holder as claimed in claim 1, wherein the non-connected end of the short leg comprises a tab substantially perpendicular to the short leg and extending into said space thereby covering the end of the line retention means so as to hold in place and protect the end of the cushioned material.

4. The fisherman's line holder as claimed in claim 1, wherein the finger portion of the long leg further comprises a cutout(s).

5. The fisherman's line holder as claimed in claim 1, wherein the portion of the long leg which engages with said second face of the line retention means comprises a longitudinally extending cutout(s) so as to allow scissors to more easily cut the line held between the inner face of the long leg and the second face of the line retention means.

6. The fisherman's line holder as claimed in claim 1, wherein the line holder comprises an attachment point for attaching the line holder to a person with a device selected from the group consisting of: a lanyard, a clap, a split ring, a cable reel and a cord.

7. The fisherman's line holder as claimed in claim 6, wherein the attachment point is in the form of a hole in the rigid body.

8. The fisherman's line holder as claimed in claim 1, wherein the line holder is capable of receiving line(s) of different sizes and shapes.

9. The fisherman's line holder as claimed in claim 1, wherein the long leg finger portion is offset from said long leg portion adjacent said line retention means.

* * * * *